(12) United States Patent
Yoshida (10) Patent No.: US 7,337,155 B2
(45) Date of Patent: Feb. 26, 2008

(54) COMMUNICATION ANALYSIS APPARATUS

(75) Inventor: Takeo Yoshida, Nakano-ku (JP)

(73) Assignee: Fuji Xerox Co., Ltd., Tokyo (JP)

( * ) Notice: Subject to any disclaimer, the term of this patent is extended or adjusted under 35 U.S.C. 154(b) by 853 days.

(21) Appl. No.: 10/379,578

(22) Filed: Mar. 6, 2003

(65) Prior Publication Data

US 2004/0083389 A1    Apr. 29, 2004

(30) Foreign Application Priority Data

Oct. 24, 2002   (JP)   ............... 2002-309655

(51) Int. Cl.
*G06E 1/00* (2006.01)
(52) U.S. Cl. .................. 706/15; 706/21; 709/224; 726/22
(58) Field of Classification Search ............. None
See application file for complete search history.

(56) References Cited

U.S. PATENT DOCUMENTS

| | | | | |
|---|---|---|---|---|
| 4,965,743 | A * | 10/1990 | Malin et al. ................. 706/45 |
| 5,511,191 | A * | 4/1996 | de Leeuw van Weenen et al. ..................... 707/100 |
| 5,636,344 | A * | 6/1997 | Lewis .................... 709/224 |
| 5,819,226 | A * | 10/1998 | Gopinathan et al. ......... 705/44 |
| 6,192,403 | B1 * | 2/2001 | Jong et al. ................ 709/224 |
| 6,219,050 | B1 * | 4/2001 | Schaffer .................. 715/853 |
| 6,330,546 | B1 * | 12/2001 | Gopinathan et al. .......... 705/35 |
| 6,769,066 | B1 * | 7/2004 | Botros et al. .............. 726/23 |
| 6,922,696 | B1 * | 7/2005 | Lincoln et al. ............. 707/101 |
| 6,990,518 | B1 * | 1/2006 | Secer ...................... 709/223 |

FOREIGN PATENT DOCUMENTS

| | | |
|---|---|---|
| JP | A 2000-22739 | 1/2000 |
| JP | A-2001-222513 | 8/2001 |
| JP | A-2002-57722 | 2/2002 |
| WO | WO 02/075339 A1 | 9/2002 |

OTHER PUBLICATIONS

"Time series prediction with neural networks: a case study of two examples", Rape, R., Fefer, D., Drnovsek, J., Instrumentation and Measurement Technology Conference, 1994. IMTC/94. Conference Proceedings. 10th Anniversary. Advanced Technologies in I & M., 1994 IEEE, May 10-12, 1994, pp. 145-148 vol. 1.*

* cited by examiner

*Primary Examiner*—David Vincent
*Assistant Examiner*—Mai T Tran
(74) *Attorney, Agent, or Firm*—Oliff & Berridge, PLC.

(57) ABSTRACT

To deal with user network communication activity which cannot easily and clearly be determined as problematic behavior, a behavior analysis apparatus 14 monitors communication between each user PC 16 in a domain 10 and Internet 20 via a gateway apparatus 12. For example, when there is a monitored item related to information leakage of the user in the detected communication, a weight value corresponding to the monitored item is added to a score concerning a possibility of the user leaking information. Subsequently, the scores are totaled and recorded for each unit of time. The behavior analysis apparatus 14 inputs data of time-series transition of the total value to a neural network which has performed learning for prediction processing, and predicts the possibility of the user's information leak at a time in the near future. When an increasing risk of leakage is predicted, the behavior analysis apparatus 14 communicates an alarm to a security manager.

26 Claims, 5 Drawing Sheets

FIG. 1

| | ITEM TO BE MONITORED | INFORMATION LEAKAGE | RESOURCE WASTING | LOYALTY |
|---|---|---|---|---|
| ELECTRONIC MAIL | Cc INCLUDES MAILING LIST ADDRESS | 2 | | |
| | Bcc INCLUDES OUTSIDE ADDRESS | 3 | | |
| | NUMBER OF MAILS SENT/RECEIVED IN ONE DAY | RULE a | RULE b | RULE c |
| | MAIL TO OUTSIDE INCLUDES WORD IN GROUP A | 3 | | |
| | MAIL TO OUTSIDE INCLUDES WORD IN GROUP B | 2 | | |
| | MAIL TO OUTSIDE INCLUDES WORD IN GROUP C | | 1 | 2 |
| | ⋮ | ⋮ | ⋮ | ⋮ |
| HTTP | ACCESS TO URL IN GROUP D | | 3 | |
| | ACCESS TO URL IN GROUP E | 1 | | 3 |
| | NUMBER OF ACCESSES TO OUTSIDE URL IN ONE DAY | RULE d | RULE e | RULE f |
| | INPUT KEYWORD TO INDEX SITE ICLUDES WORD OF GROUP F | | | 3 |
| | DOWN LOAD OF JPEG FILE | | 2 | |
| | ⋮ | ⋮ | ⋮ | ⋮ |
| FTP | DOWNLOAD OF JPEG FILE | | 2 | |
| | DOWNLOAD OF MP3 FILE | | 2 | |
| | NUMBER OF DOWNLOADS IN ONE DAY | RULE g | RULE h | RULE i |
| | ⋮ | ⋮ | ⋮ | ⋮ |

COMMUNICATION ANALYSIS APPARATUS

BACKGROUND OF THE INVENTION

1. Field of the Invention

The present invention relates to analysis of problematic behavior of users of a data communication network, and to a security technique using this analysis.

2. Description of the Related Art

In networked organizations, problem behavior of organization staff using the network has, especially in recent years, raised problems regarding information security. Examples of well-known problems range from private browsing of web pages and private use of network resources such as a private-use mail, to the leaking of information to outsiders.

As a countermeasure for preventing organization staff from illicitly using the organization network, a filtering techniques have been used. In a typical filtering technique, filter rules such as a uniform resource locator (URL) which is an access limitation object and addresses to which electronic mails cannot be transmitted are registered beforehand in a gateway disposed between an in-company LAN and Internet. With issuance of an HTTP request or electronic mail which infringes on the filter rule from the LAN, the request or mail is not transmitted outside the LAN blocked by the gateway.

Moreover, in Japanese Patent Application Laid-Open No. 2000-22739, an electronic mail system is disclosed in which filtering processing is used to prevent the leaking of information. In the processing, transmission of the electronic mail is permitted only when transmitter (sender) and transmission destination (recipient) of the electronic mail prepared by a user agree with a pre-registered pair of the transmitter and transmission destination.

This filtering processing is effective in that access to websites or transmission of mail can be limited. However, in actuality, because there are many websites and electronic messages for which it is unclear whether or not a problem is presented, if access to all such sites or mail is uniformly limited, there is a possibility that legitimate business will be obstructed.

SUMMARY OF THE INVENTION

The present invention provides a tool for handling a user's network communication behavior which cannot otherwise by readily or easily recognized as problematic behavior.

According to the present invention, there is provided a communication analysis apparatus comprising a monitor for monitoring use of a network protocol of a user in a domain; an evaluation system for calculating a behavior score of the user concerning a predetermined object of analysis from a monitored result of the network protocol use of the user; and a state analyzer for judging a state of the user concerning the predetermined object of analysis based on the behavior score to output a judged result.

In a preferred aspect of the present invention, the state analyzer may records time-series transition of the behavior score calculated by the evaluation system and judge the user's state based on a pattern of the transition till a current time.

In another preferred aspect of the present invention, the state analyzer uses a neural network which trained with the record of the time-series transition of the user's behavior score in order to predict future of the transition of the behavior score, inputs the recording of the transition of the behavior score for a predetermined period traced back from the current time into the neural network, and consequently judges the user's state based on a predicted result obtained as an output of the neural network.

DESCRIPTION OF THE PREFERRED EMBODIMENT

An embodiment of the present invention will be described hereinafter with reference to the drawings.

Figure 1:
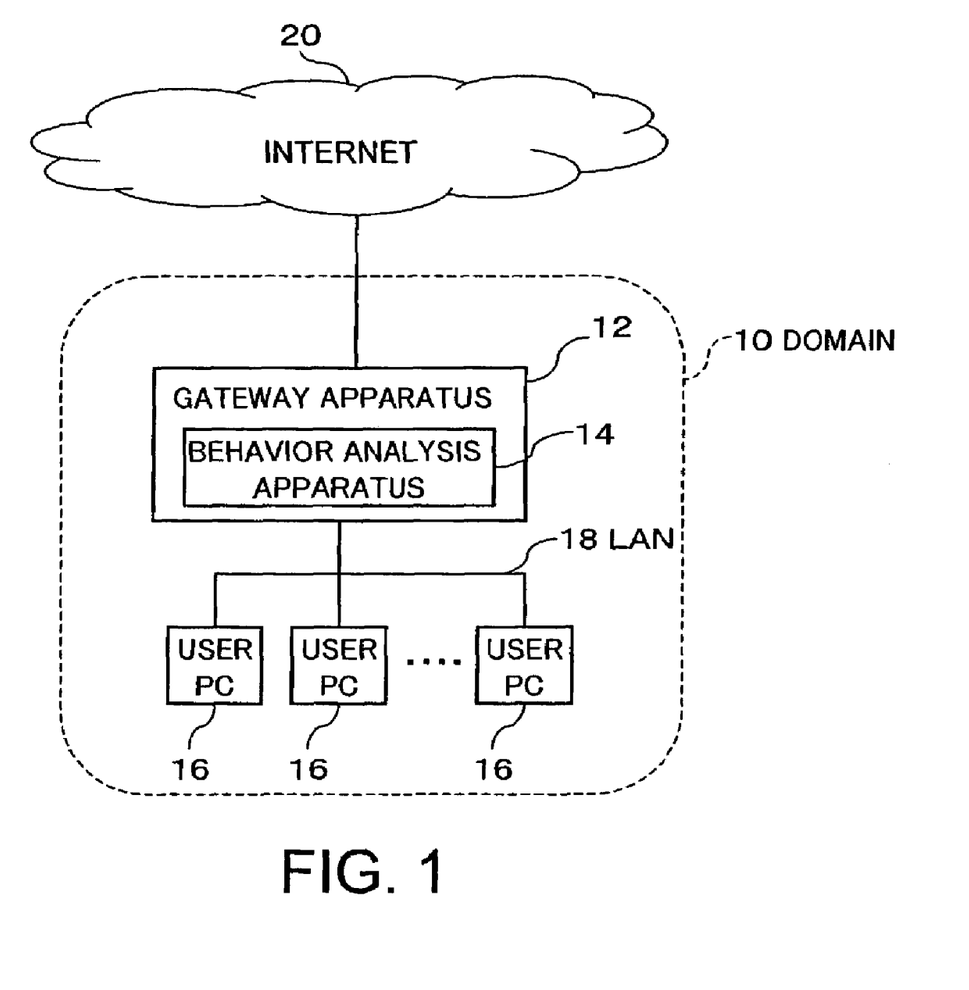
FIG. 1 is a diagram showing an example constitution of a system according to the present invention.

FIG. 1 is a diagram showing the constitution of a system according to the embodiment of the present invention.

In the system, a gateway apparatus 12 is installed in a domain 10 of a networked organization, such as a corporation, and relays communication between LAN 18 and Internet 20 within domain 10. The communication between each user personal computer (PC) on LAN 18 in domain 10 and each apparatus in Internet 20 must pass through gateway apparatus 12. For example, the gateway apparatus 12 may be constituted by a computer which executes a program for converting each type of protocol between LAN 18 and Internet 20.

In the present embodiment, a behavior analysis apparatus 14 is disposed in gateway apparatus 12. In rough terms, behavior analysis apparatus 14 monitors all communication which passes through gateway apparatus 12 and uses various types of network protocols, and analyzes the state of user who uses each user PC 16 on LAN 18 based on the monitored result, where the user's state refers to an object of analysis (analysis viewpoint) that includes a degree of risk concerning problematic user behavior, such as information leakage and misuse of network resources. Moreover, in another example, behavior analysis apparatus 14 can also analyze a user's mental state, such as their loyalty or likelihood of leaving the corporation to which domain 10 belongs.

In one embodiment, behavior analysis apparatus 14 converts a content of each communication data which passes through gateway apparatus 12 and a statistic amount per unit period concerning the user's communication to scores concerning each measured object, and totals the scores. Moreover, the user's state concerning each object of analysis is judged from the behavior score concerning each object of analysis.

In this state judgment, for example, it is judged in whether or not the user is in a "normal" state. Moreover, it is also possible to execute processing comprising classifying user states into detailed risk levels; and determining the risk level in which a particular user is, or will be in near future.

Figure 2:
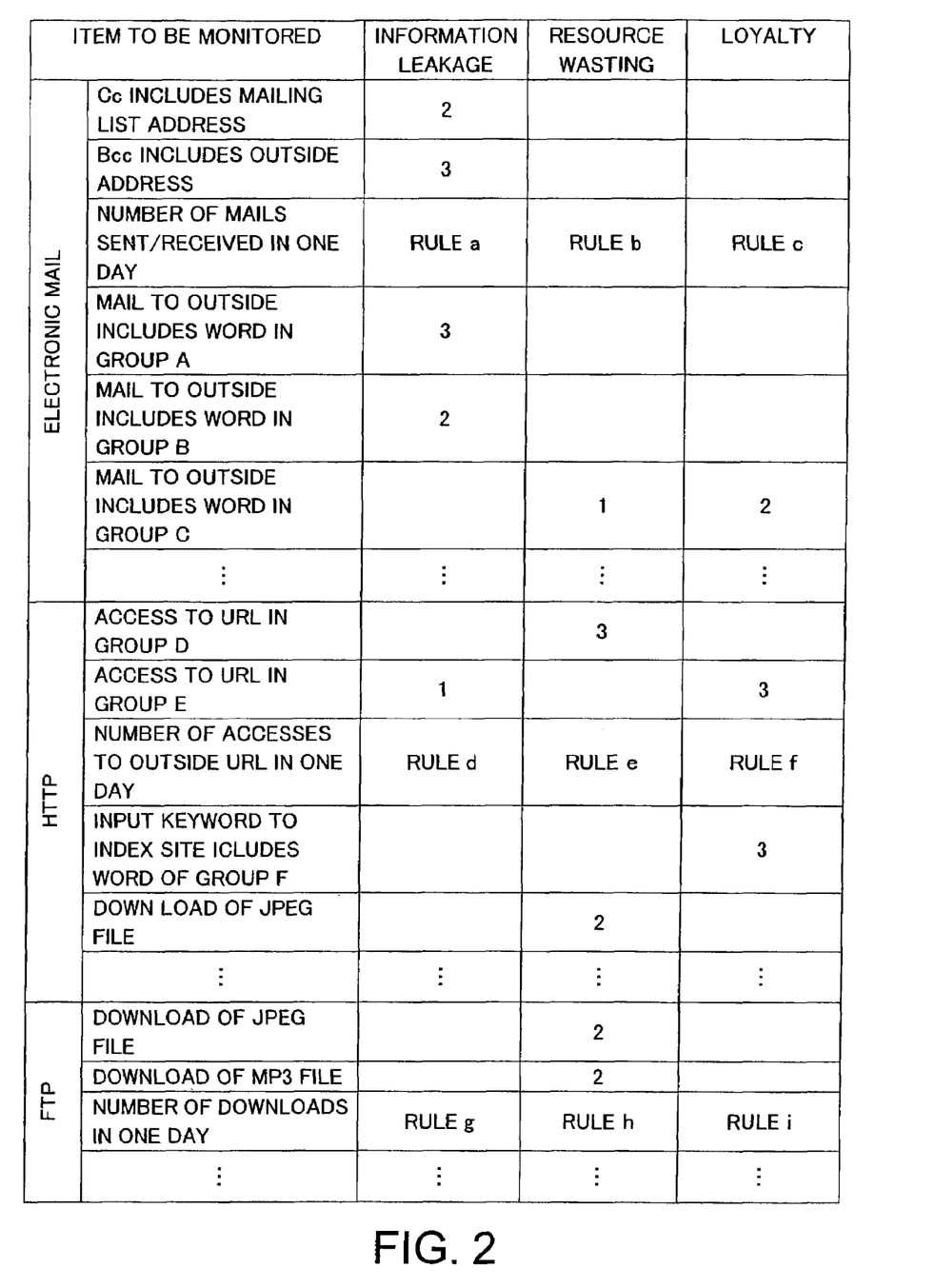
FIG. 2 is a diagram showing an example of a weight value table.

FIG. 2 shows an example of a weight table which indicates a correspondence between items to be monitored with respect to the communication performed by the user using a network protocol, and weight values (behavior scores) corresponding to the items. In the table of FIG. 2, a blank box indicates that the weight value is 0.

In the table, the weight values of the respective items to be monitored are registered with respect to three measured objects including information leakage, resource wasting, and loyalty. The information leakage object is an object for judging the risk of the user leaking confidential organization information (in-house information). The resource wasting is a measure of the user's tendency to use network resource provided for use in performing organization business (e.g., the user PC 16 or bandwidth of LAN 18) and their working hours for purposes other than business purposes. Loyalty is an object measuring the likelihood of the user leaving the organization.

The items to be monitored are set for each network protocol relayed by the gateway apparatus 12. In the illustrated example, examples of the network protocol include electronic mail protocols (such as a simple mail transfer protocol (SMTP) and post office protocol (POP)), hypertext transfer protocol (HTTP), and file transfer protocol (FTP), but these are just examples. Not all illustrated protocols need be included, and protocols other than the illustrated protocols may, of course, be employed in addition to or in place of the illustrated protocols.

Examples of the items to be monitored related to the electronic mail protocol may include "carbon copy (Cc) address field includes an address of a mailing list (ML)", "blind carbon copy (Bcc) address field includes an address outside the corporation", and the like. For each item, the transmission of a single corresponding electronic mail is not sufficient to determine that the sender is leaking in-house information, but one or more positive instances can be used to determine that the user presents significant of information leakage, and the weight value is assigned to the measured object "information leakage".

Moreover, items "mail to outside recipient includes a Group A expression" and "mail to outside recipient includes a Group B expression" both relate to whether or not a typical keyword included in an electronic mail indicates a possibility that information is being leaked. Group A includes keywords which are believed linked to higher probability of information leakage than those of group B, and therefore a larger weight value is given to the words in group A. For example, the group A includes expressions such as "in house use only", "departmental use only", and "minutes", while group B includes terms such as "specifications" and "manual". Moreover, for the item "mail to outside recipent includes a Group C expression", different weight values are given to objects "Loyalty" and "resource wasting". Here, Group C includes typical keywords which represent or suggest that the user is seeking a new job, such as "new job" and "annual income".

It is to be noted that the keywords included in the electronic mail are monitored by checking any combination of the subject or body text of the electronic mail, name of an attached file, or the content of the file itself. In other words, the keyword monitor object may include multiple items, or may be limited to specific items such as the subject.

Moreover, with respect to the same keyword, different weight values can also be given to the subject, text, and attached files.

Furthermore, because various keywords included in the respective groups may be considered general keywords or keywords particular to the industry or organizations, the keywords is preferably customized for the domain 10. Examples of keywords unique to a particular company could include, as keywords related to loyalty, a name of a competitor in the same industry.

Additionally, "the number of mails to or from outside per day" indicates the frequency of communication of the user with parties outside the organization. A degree of frequency possibly has some relation with information leakage, resource wasting, and loyalty. In the table in FIG. 2, each conversion rule (e.g., conversion function) for converting the number of transmitted/received mails to the weight value of each measured object is registered. It is to be noted that although here that the frequency of mail transmission/reception is totaled in units of one day, other units such as hours or weeks may be selected as appropriate according to the circumstances of that organization and time. This also applies to the number of accesses to outside URLs as described below or to the amount of downloaded files.

Moreover, for the monitored item concerning HTTP, for example, a URL of a website which is not related to the business is registered in a group D, and sites which are related to resignation/job change, such as a site of another company in the same industry and a job change site are registered in a group E. It is known by analysis of a transmitted HTTP command that the user has accessed the site corresponding to each group, and the weight value obtained from the table is then added to the corresponding behavior score of each measured object. There is a possibility that "the number of accesses to the outside URL per day" may correlate with information leakage, resource wasting, and loyalty in a manner to that for electronic mail described above. The conversion rule for converting the number of accesses to the weight value of each measured object is registered in the weight value table. Moreover, for the keyword to an search site, keywords suggesting the loyalty such as a character string "job change site" and the names of competitors in the same industry are registered in a group F. The behavior analysis apparatus 14 analyzes a search keyword sent to one or a plurality of registered search sites, and adds a weight value of 3 to the behavior score concerning the measured object "information leak" when finding an expression included in the group F in the keywords. It is to be noted that for the URLs of the groups D, E and the keywords of the group F, in the same manner as in the keywords of the electronic mail, varieties such as general URLs and keywords and URLs and keywords specific to the industry or company may be considered. The URL and keyword are preferably customized for the domain 10. Moreover, because the HTTP protocol enables file downloading, it is also possible to measure a degree of the resource wasting in accordance with the type of the file downloaded by the user. In the illustrated example, there is a high probability that the downloaded image files such as JPEG and music files such as MP3 do not relate to the business, and therefore a certain weight value is assigned to the viewpoint of the resource wasting.

Furthermore, in the items to be monitored concerning FTP, for example, the weight value of the resource wasting is assigned to the downloading of certain files types, such as JPEG and MP3. Additionally, there is a possibility that "the number of files downloaded in one day" has some relation to the information leakage, resource wasting, and loyalty in the same manner as in the electronic mail. The conversion rule for converting the number of accesses to the weight value of each measured object is registered in the weight value table.

An example table for converting a user's communication using the network protocol to the weight value concerning each measured object was described above with reference to FIG. 2. Additionally, the example of FIG. 2 is only one example. For example, various conditions other than the illustrated items can be included in the items to be monitored. Moreover, for the keyword of the electronic mail, the item to be monitored can be set not only by the single keyword, but also by logical expression such as AND conditions of a plurality of keywords. Furthermore, various statistic amounts per unit time of each protocol, such as a total amount of data uploaded or downloaded by the user by FTP in one day and a total download time of one day, are preferably included in the item.

Additionally, even when the communication corresponds to the same item to be monitored, significance of the meaning of the communication with respect to the measured object will differ according to user, job, or position. For example, with the same transmission/reception amount of mails with respect to the outside of the company per day of one hundred mails, the amount is ordinary for a person who exchanges many mails with parties outside the organization. On the other hand, for a person who typically exchanges few mails with the outside, the amount may indicate a significant change in their situation. Differences in frequency may be caused by individual differences, or differences between job responsibilities between, for example, someone in the sales department person who is in contact with many outside the company and a clerk whose activity is mainly inside the company. Therefore, the weight value table shown in FIG. 2 is prepared for each group according to user job responsibilities or position, and the table of the group to which the user belongs is used for each user, so that higher-precision analysis is possible. Furthermore, when the weight value table is customized for each user in the domain 10, further improvement of analysis precision can be expected.

Figure 3:
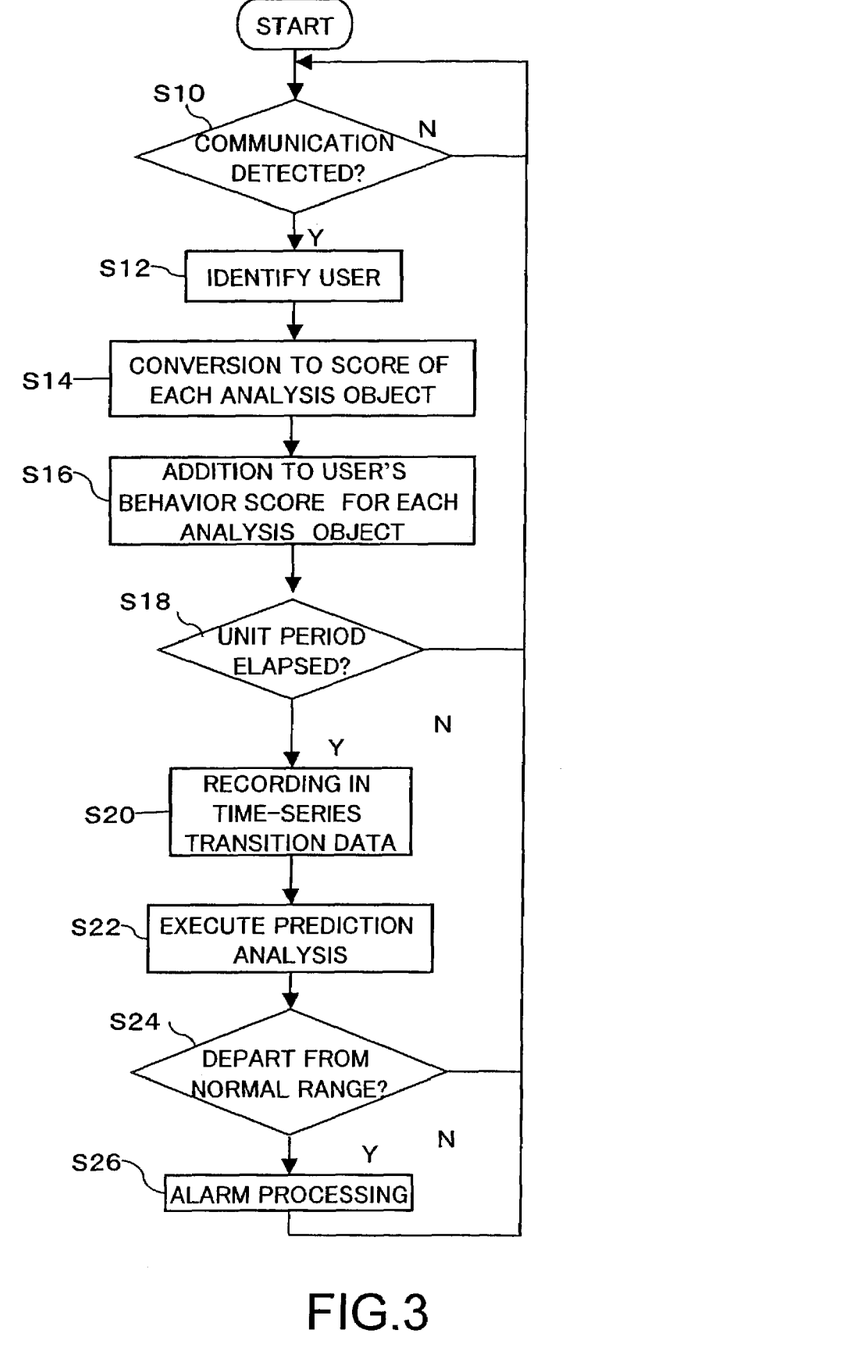
FIG. 3 is a flowchart showing a processing procedure of a behavior analysis apparatus.

FIG. 3 is a flowchart showing processing of behavior analysis apparatus 14. In this process, behavior analysis apparatus 14 monitors each user's communication passed through the gateway apparatus 12 (S10). Subsequently, when detecting communication passing through gateway apparatus 12, behavior analysis apparatus 14 identifies a user in domain 10 who is a sender or recipient of the communication from the address information of sender or recipient included in the data of communication (e.g., IP address) (S12). Subsequently, behavior analysis apparatus 14 analyzes the data of communication, searches for the item indicated in the weight value table, which corresponds to the communication data, and obtains the weight value of each measured object with respect to the corresponding item if any (S14). In this case, when the weight value table is prepared by the unit of a user group or user, the table for the user is used. Subsequently, the weight value of each measured object obtained in this manner is added to the behavior score of the measured object (S16).

In the present embodiment, the processing of the above-described steps S10 to S16 is repeated until a predetermined unit time (e.g., one day or one week) elapses (S18). Subsequently, when the unit time elapses, the total value of the behavior scores of each measured object for the time is recorded in time-series transition data (S20). In the time-series transition data in a simplest form, the behavior scores of each measured object for each unit time are arranged in a time-series order. A date or week number by which the unit time is specified may also be associated and recorded with respect to each total value for each unit time. It is to be noted that some of the monitored items are based on statistical analysis of use of each protocol in a certain unit of time. In such case, after the unit time elapses, the resulting statistical amount may be converted to the weight value using the weight value table and then added to the behavior score.

When the information of the time-series transition data with respect to each behavior score increases in this manner, the behavior analysis apparatus 14 analyzes the time-series transition data (S22) to predict future change of user state concerning each measured object. In the present embodiment, a neural network is used as a tool of the prediction. The use of the neural network is similar to use of a neural network in, for example, predicting stock prices or power demand. That is, for example, the time-series transition data of the existing behavior scores is used as training data. Among the data, transition data for a predetermined period before a certain time is input. At this time, the neural network uses the data to perform learning in order to output the behavior scores for a certain time or period after a predetermined time (or in a range in which the scores exist).

Figure 4:
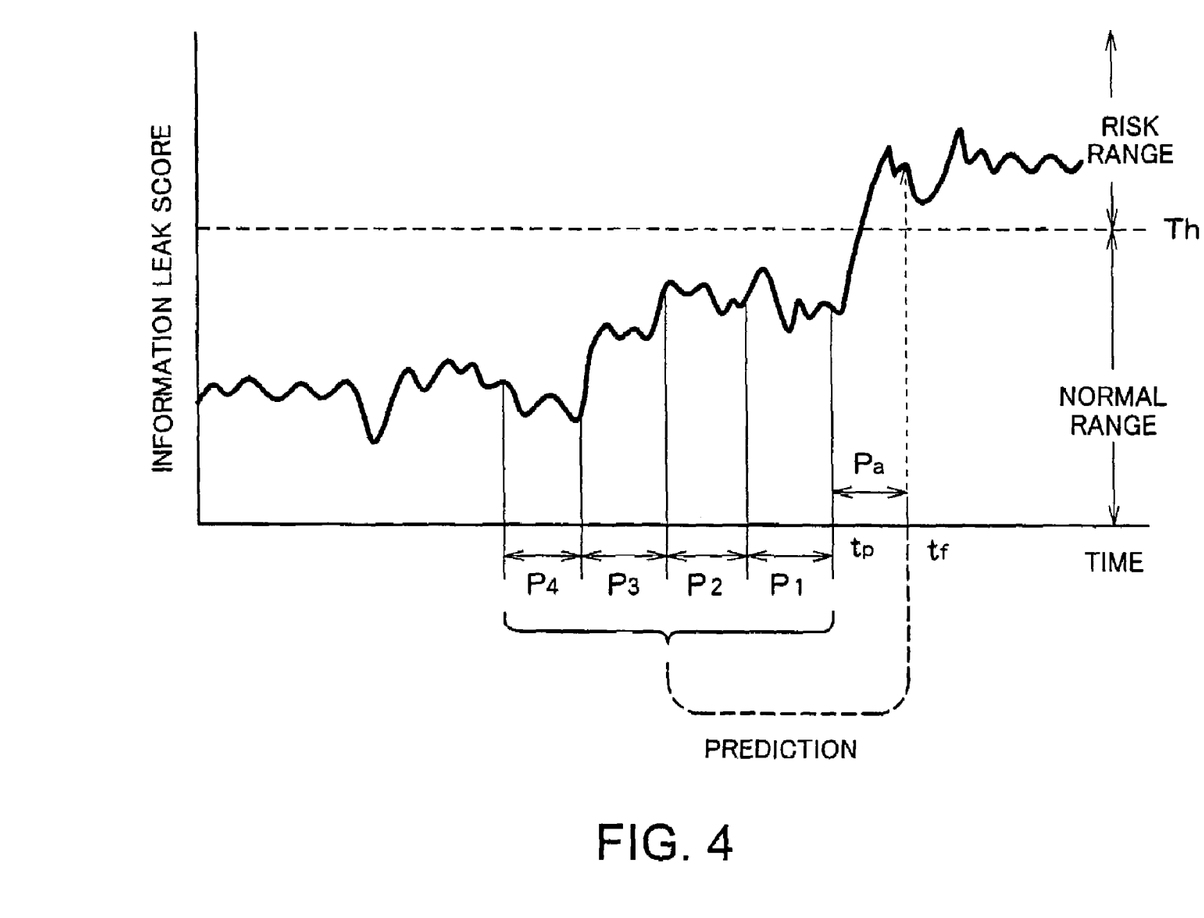
FIG. 4 is an explanatory view of prediction processing in the behavior analysis apparatus.

For example, in the graph shown in FIG. 4, the ordinate indicates the behavior score with respect to the viewpoint of the information leak, the abscissa indicates time, and a curve shows the time-series transition of the score. In this example, a total of behavior scores in each of periods P1, P2, P3, P4 having predetermined widths traced back from a certain reference time tp is obtained. Moreover, the total value of each of the periods P1, P2, P3, P4 is input to the neural network. As a result, the neural network outputs the behavior score at a time tf after the predetermined period from the reference time tp (since past data is used, the value at tf may be predicted). To achieve this, a teacher signal is input to the neural network, and known learning algorithms such as a back propagation method are used to allow the neural network to perform the learning. This neural network is preferably prepared for each user. The neural network is prepared for each user, and trained with the time-series transition data of past user behavior scores, so that the neural network for prediction can be prepared for each user. Moreover, instead of preparing the neural network for prediction for each user, the network may be prepared for each user group and constituted such that a user belonging to a group uses the neural network of the group to which they belong.

The neural network which has trained until obtaining a sufficient prediction precision in this manner is used in the prediction of step S22.

In prediction processing of step S22, in the same manner as in the training stage above mentioned, the data of the behavior scores in each of the periods P1, P2, P3, P4 traced back from the current time tp is input into the trained neural network. As a result, the value output from the neural network is used as a predicted value of the behavior score at a future time tf after the predetermined period $P_a$. Subsequently, behavior analysis apparatus 14 judges whether or not the predicted value departs from a normal range (S24). Here, because the predicted value is in the normal range, it is judged that there is little likelihood that the user communication behavior with respect to the measured object will be problematic in the near future, or over the period of prediction. Therefore, the processing returns to step S10. On the other hand, when at step S24 the predicted value with respect to a certain user's analysis object is judged to depart from the normal range, behavior analysis apparatus 14 executes a predetermined alarm processing (S26). In this alarm processing, for example, managers such as a security manager or a personnel manager in the organization are notified of a message informing of a high probability that the user may enter a problem state in the future with respect to the object of analysis via the electronic mail. Thereby, the manager can be aware in advance of this possibility that the user in domain 10 has a problem, before the problem becomes significant, and can take appropriate preventive measures. For example, when it is predicted that the score of a certain user's loyalty departs from the normal range, the personnel manager can counsel the user at an early stage in accordance with this prediction. Moreover, when organization resources are being wasted, alarm processing is also effective such as issuance of a message which calls the user's attention to the waste.

It is to be noted that a threshold value Th of the behavior score for distinguishing the normal range can be obtained by statistical processing of correlations between each user's time-series transition data in the domain 10 in the past and curent behavior of the user. If this is insufficient, similar data in operation groups having similarity to the domain 10, such as the same type of business, can be further statistically processed.

Figure 5:
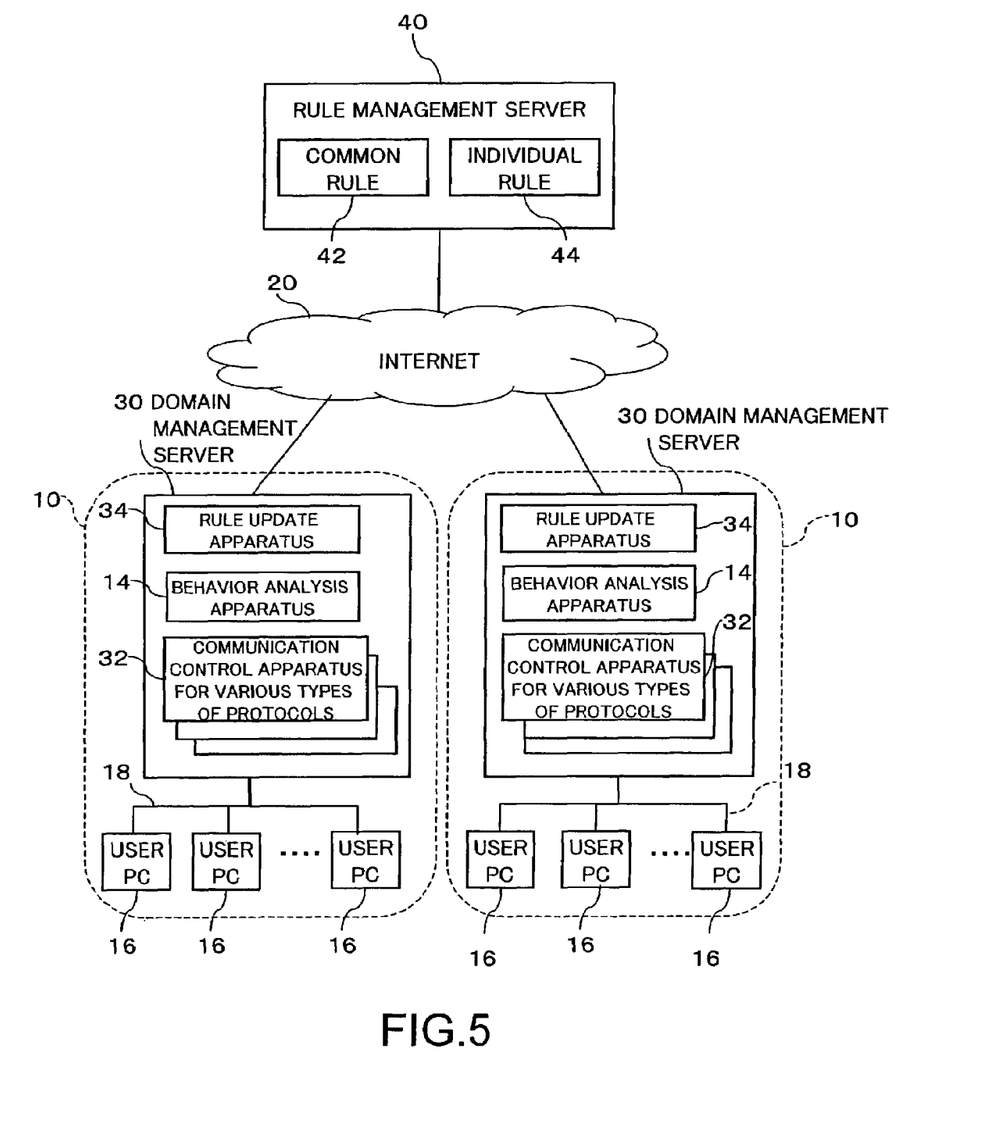
FIG. 5 is a diagram showing another example constitution of a system according to the present invention.

FIG. 5 is a diagram showing another example constitution of a system to which the present invention is applied. In this example, there are a plurality of domains 10 each of which is managed by a domain management server 30 including the behavior analysis apparatus 14 constituted in the same manner as in the constitution of FIG. 1 on the Internet 20. The domain management server 30 relays the communication of all usable protocols between the LAN 18 within and outside of each domain 10. The domain management server 30 includes a communication control apparatus 32 (realized by software) for controlling the communication of each protocol. The domain management server 30 basically closes all communication ports to the Internet 20, and thereby prevents, or at least impedes, external intrusion into the domain 10. In such a case, for example, in the transmission of electronic mail, the domain management server 30 first accumulates transmitted mails from the respective users in the domain 10, then uploads the group of accumulated transmission mails in a predetermined relay server (omitted from the drawing) connected to the Internet 20. On the other hand, to receive electronic mail, the domain management server 30 of each domain periodically accesses the relay server, collectively downloads the electronic mail group addressed to the domain, and distributes the group to the respective users in the domain 10. In such a case, because the domain management server 30 does not have to keep open the SMTP reception port, higher security can be expected. Moreover, in this system, the domain management server 30 periodically accesses a network constituting management server (omitted from the drawing) disposed on the Internet 20 in order to handle changes of the system configuration such as a dynamic change of the relay server of the electronic mail, and downloads the information of the system configuration to update the information.

In a system with this constitution, such as the example of the present embodiment, a rule management server 40 is disposed on the Internet 20. The rule management server 40 manages rule information for analysis in the behavior analysis apparatus 14. Examples of the rule information include the weight value table shown in FIG. 2. The rule information includes a common rule 42 among all the domains 10 and users, and individual rules 44 specific to each domain 10, each user group in the domain, and each user.

A rule update apparatus 34 of each domain management server 30 periodically accesses the rule management server 40, downloads the information of the common rule 42 or the individual rule 44 associated with the managed domain, and updates the rule of analysis in the behavior analysis apparatus 14 of the managed domain based on the information. Moreover, during the access, the rule update apparatus 34 uploads to the rule management server 40 the time-series transition data of each behavior score accumulated from the previous access to the present access. The rule management server 40 subjects the uploaded data to a sophisticated statistical processing which is difficult for the domain management server 30, and thereby performs upddate of the rule, such as the update of each weight value of the weight value table to a more appropriate value. Moreover, in response to a request from the domain 10, rule changes, such as addition of the item to be monitored peculiar to the domain, are also performed. These updates and changes are reflected in the common rule 42 or in the individual rule 44, and thereafter reflected in each behavior analysis apparatus 14 by the periodic access of each domain management server 30. According to the present constitution, the analysis rule of the behavior analysis apparatus 14 of each domain 10 can be automatically updated as desired or necessary.

Moreover, although, as described above, neural network training related to prediction is performed to predict the behavior score at a time in the future based on past data, this is just one example. For example, another embodiment may comprise predicting an average value of the behavior scores for a predetermined period in the future from the time-series transition in the past predetermined period, or predicting whether or not the average value is in the normal range. Moreover, although in the above description to predict the state of the near future of the user concerning a certain analysis object only the past data of the behavior score of the certain object is used, it is also possible to use the past data of the behavior score of other analysis objects for prediction with respect to the certain object. In such a case, the score of the other objects may also be input to the neural network.

Furthermore, in the above-described example, the behavior scores are totaled in time period units, such as units of days. However, when the behavior scores are totaled by a plurality of unit periods, such as units of days and weeks, a plurality of different time-series transition data of the total unit period can be obtained with respect to one analysis object. In this case, in the prediction processing, it is also possible to predict a future user state from the past data of the plurality of types of time-series transition data.

Additionally, although in the above-described example the behavior scores of each analysis object are obtained by combining the monitored results of all the monitored items of protocols relayed by the gateway apparatus 12, this is just one example. In another example, the behavior scores of each analysis object may be calculated individually for each protocol to prepare individual time-series transition data. In such a case, the prediction processing may be constituted by inputting the past data of the time-series transition data of each protocol concerning the noted analysis object into the neural network, and then predicting the future tendencies. With this constitution, the value of the time-series transition data at each time is a point in a multidimensional space in which the behavior score of each protocol is a coordinate value, and the time-series transition data indicates a trajectory of the point which moves with elapse of time. This can also apply to the predicted value, and it is judged whether or not the predicted value is in the normal range by judging whether or not the point represented by the predicted value is in the space (this is obtained from the past data of the domain 10) of the normal range set in the multidimensional space.

Moreover, rather than generally evaluating the time-series transition data recorded for each protocol, the prediction processing and alarm processing may also be constituted such that they are performed for each protocol.

Furthermore, although in the above description it is judged whether or not the predicted value is in the normal range, this is also just one example. It is also possible, for example, to divide the predicted value into levels of detail, and to execute the alarm processing in accordance with the level to which the predicted value belongs.

Additionally, when the predicted value of the behavior score concerning the certain analysis object of a certain user departs from the normal range, instead of or in addition to the alarm processing, a defensive measure can also be taken beforehand in order to prevent the user from causing a predicted problematic behavior concerning the analysis object. In an example of such a defensive measure, when the behavior analysis apparatus 14 judges the possibility of a certain user leaking information, the gateway apparatus 12 can limit their use of the SMTP or FTP protocols.

Moreover, although in the above-described example all the protocols relayed by the gateway apparatus 12 are monitored, a constitution for limiting the protocols to be monitored is, of course, also possible. For example, when an increasing risk of information leakage by a certain user is predicted as a result of monitoring of the electronic mail protocol, the defensive measure can prohibit the user from using the electronic mail protocol. Also, instead of or in addition to prohibiting of the electronic mail protocol, it may also be preferable to prohibit the use of the protocols which can transfer large-capacity data, such as FTP and HTTP.

Furthermore, although in the above-described example, when communication corresponding to the monitored item of the weight value table (FIG. 2) is detected, the behavior scores are simply totaled. However, a filter operation corresponding to each monitored item (e.g., an operation of not transmitting the electronic mail corresponding to the monitored item to any address, the prohibiting of the use of the protocol corresponding to the monitored item, and the like) may also be performed.

Additionally, in the above-described example, the user's state in the near future is predicted from the time-series transition data of the behavior score of each analysis object, and processing such as the alarm processing is performed based on the prediction. Instead, for example, the current user's state may also be judged based on the value of the behavior score till the current time, or a group of the values for the predetermined period at the current time.

Moreover, although in the above-described example, each monitored item is converted to a measure of the common behavior score (weight value), summed, and evaluated, this is not essential to the present invention. Instead, for example, the frequency of communication corresponding to each monitored item (communication per unit time) may also be used as a score concerning the corresponding item, the time-series transition data of the score is obtained for each item, and the user state of each analysis object may be judged or predicted from each transition data. In such a case, the past time-series transition data of each monitored item is input to the neural network, and the neural network may be trained in order to output the predicted result of the user's state in the near future concerning the noted analysis object, or the judged result of the current state. When a relatively large number of items are preset as the monitored items, an item not closely related to the analysis viewpoint is given a relatively very small synapse connection weight during the training process. Therefore, after the training process, a synapse connection having a weight smaller than a predetermined threshold value may be found from the synapse connection extending from each input neuron (each corresponds to the monitored item), and the corresponding monitored item may be excluded from the monitored object in each behavior analysis apparatus 14. This can reduce the processing load of the behavior analysis apparatus 14.

Furthermore, although in the above-described examples a neural network is used during prediction, prediction techniques other than neural networks, such as an expert system, may be employed.

Additionally, in another example of the analysis viewpoint, there is a risk of a cracking extending to the outside from the domain 10. That is, since the cracking has a very serious ethical problem in the network, the cracking is intended to be prevented beforehand by the monitoring in the gateway apparatus 12. With the cracking, in general, port scanning is frequently performed with respect to the specified IP address. However, the port scanning is used so that the network manager checks an empty port, or the general user confirms an alive state of an opposite-end site. Even when a port scan command is simply issued to the outside from the domain 10, it cannot instantly be judged that there is the cracking. To solve the problem, in this case, the behavior analysis apparatus 14 records occurrence of the port scanning from the user. When the port scanning with respect to the same IP address is continued with a frequency not less than a predetermined judgment reference frequency in the time-series data recorded in this manner, it is judged that there is a possibility of cracking. Then, the measures such as the alarm processing and the prohibition of the user from using various network protocols are performed.

What is claimed is:

1. A communication analysis apparatus comprising:
   a monitor for monitoring use of a network protocol by a user in a management object domain, where the user is authorized to use the network protocol;
   an evaluation system for calculating a behavior score of the user based on judging risk of the user leaking confidential information, tendency of the user to use network resources and likelihood of the user leaving an organization, from a monitored result of the network protocol use by the user;
   a storage for recording a reference time-series transition of the behavior score;
   a data input system for inputting a contemporary time-series transition of the behavior score into an artificial neural network, wherein the neural network is trained using the reference time-series transition and wherein the contemporary time-series transition includes a time-series transition of the behavior score from a current time to a predetermined period prior to the current time;
   a state analyzer for predicting a future value at a preset period after the current time based on an output of the neural network, wherein the output is determined based on the contemporary time-series transition, and judging a state of the user concerning the predetermined object of analysis based on the future value; and
   a data output system for outputting the judged state of the user.

2. The apparatus according to claim 1, wherein the evaluation system judges whether or not one or more predetermined keywords are included in communication data communicated using the network protocol to calculate the behavior score based on the monitored result.

3. The apparatus according to claim 2, wherein the evaluation system includes a table in which a weight value is stored for each keyword, and calculates the behavior score based on the weight value of each keyword detected from the communication data communicated using the network protocol.

4. The apparatus according to claim 1, wherein the evaluation system includes a table in which at least one weight value can individually be set for a plurality of preset objects of analysis for each item to be monitored with respect to the user's network protocol use, and calculates the behavior score concerning each object of analysis based on the weight value of each object of analysis corresponding to the item and based on an attribute of the user, when detecting occurrence of the item from the user's network protocol use.

5. The apparatus according to claim 1, wherein the evaluation system calculates the behavior score based on the number of uses of the network protocol in a predetermined unit period.

6. The apparatus according to claim 1, further comprising a transmission unit for transmitting an alarm to a predetermined address based on the result of judgment by the state analyzer.

7. A communication management apparatus having a function of providing a user service of one or more types of network protocols to a user in a domain, the apparatus comprising:
  a monitor for monitoring use of at least one network protocol of the user, where the user is authorized to use the network protocol;
  an evaluation system for calculating a behavior score of the user based on judging risk of the user leaking confidential information, tendency of the user to use network resources and likelihood of the user leaving an organization, from a monitored result of the network protocol use of the user;
  a storage for recording a reference time-series transition of the behavior score;
  a data input system for inputting a contemporary time-series transition of the behavior score into an artificial neural network, wherein the neural network is trained using the reference time-series transition and wherein the contemporary time-series transition includes a time-series transition of the behavior score from a current time to a predetermined period prior to the current time;
  a state analyzer for predicting a future value at a preset period after the current time based on an output of the neural network, wherein the output is determined based on the contemporary time-series transition, and judging a state of the user concerning the predetermined object of analysis based on the future value; and
  a communication controller for controlling whether or not the user is allowed to use at least one of the network protocols based on the judged state of the user.

8. The apparatus according to claim 7, wherein the evaluation system judges whether or not one or more predetermined keywords are included in communication data communicated using the network protocol to calculate the behavior score based on the monitored result.

9. The apparatus according to claim 8, wherein the evaluation system includes a table in which a weight value is stored for each keyword, and calculates the behavior score based on the weight value of each keyword detected from the communication data communicated using the network protocol.

10. The apparatus according to claim 7, wherein the evaluation system includes a table in which at least one weight value can individually be set for a plurality of preset objects of analysis for each item to be monitored with respect to the user's network protocol use, and calculates the behavior score concerning each object of analysis based on the weight value of each object of analysis corresponding to the item and based on an attribute of the user, when detecting generation of the item from the user's network protocol use.

11. The apparatus according to claim 7, wherein the evaluation system calculates the behavior score based on the number of uses of the network protocol in a predetermined unit period.

12. The apparatus according to claim 7, further comprising a transmission unit for transmitting an alarm to a predetermined address based on the result of judgment by the state analyzer.

13. A communication analysis method comprising:
  a monitor step of monitoring use of a network protocol by a user in a management object domain, where the user is authorized to use the network protocol;
  an evaluation step of calculating a behavior score of the user based on judging risk of the user leaking confidential information, tendency of the user to use network resources and likelihood of the user leaving an organization, from a monitored result of the network protocol use of the user;
  a record step of recording a reference time-series transition of the behavior score;
  an input step of inputting a contemporary time-series transition of the behavior score into an artificial neural network, wherein the neural network is trained using the reference time-series transition and wherein the contemporary time-series transition includes a time-series transition of the behavior score from a current time to a predetermined period prior to the current time;
  an analysis step of predicting a future value at a preset period after the current time based on an output of the neural network, wherein the output is determined based on the contemporary time-series transition, and judging a state of the user concerning the predetermined object of analysis based on the future value; and
  an output step of outputting the judged state of the user.

14. The method according to claim 13, wherein the evaluation step comprises the step of judging whether or not one or more predetermined keywords are included in communication data communicated using the network protocol to calculate the behavior score based on the monitored result.

15. The method according to claim 14, wherein the evaluation step comprises the steps of:
  detecting the keyword from the communication data communicated using the network protocol;
  obtaining a weight value of the detected keyword from a predetermined weight table; and
  calculating the behavior score based on the weight value of the detected keyword.

16. The method according to claim 13, wherein the evaluation step comprises:
  accessing a table in which at least one weight value can individually set for a plurality of preset objects of analysis for each item to be monitored with respect to the user's network protocol use; and
  obtaining the weight value of each object of analysis corresponding to the item from the table to calculate the behavior score concerning each object of analysis based on an obtained weight value group and an attribute of the user, when occurrence of the item is detected from the user's network protocol use.

17. The method according to claim 13, wherein the evaluation step comprises the step of calculating the behavior score based on the number of uses of the network protocol in a predetermined unit period.

18. The method according to claim 13, further comprising the step of transmitting an alarm to a predetermined address based on the result of the analysis step.

19. A communication management method comprising:
   a monitor step of monitoring use of at least one network protocol by a user in a management object domain, where the user is authorized to use the network protocol;
   an evaluation step of calculating a behavior score of the user based on judging risk of the user leaking confidential information, tendency of the user to use network resources and likelihood of the user leaving an organization, from a monitored result of the network protocol use of the user;
   a record step of recording a reference time-series transition of the behavior score;
   an input step of inputting a contemporary time-series transition of the behavior score into an artificial neural network, wherein the neural network is trained using the reference time-series transition and wherein the contemporary time-series transition includes a time-series transition of the behavior score from a current time to a predetermined period prior to the current time;
   an analysis step of predicting a future value at a preset period after the current time based on an output of the neural network, wherein the output is determined based on the contemporary time-series transition, and judging a state of the user concerning the predetermined object of analysis based on the future value; and
   a control step of controlling whether or not the user is allowed use at least one of the network protocols based on the judged state of the user.

20. The method according to claim 19, wherein the evaluation step comprises the step of judging whether or not one or more predetermined keywords are included in communication data communicated using the network protocol to calculate the behavior score based on the monitored result.

21. The method according to claim 20, wherein the evaluation step comprises the steps of detecting the keyword from the communication data communicated using the network protocol; obtaining a weight value of the detected keyword from a predetermined weight table; and calculating the behavior score based on the weight value of the detected keyword.

22. The method according to claim 19, wherein the evaluation step comprises:
   accessing a table in which at least one weight value can individually be set for a plurality of preset objects of analysis for each item to be monitored with respect to the user's network protocol use; and
   obtaining the weight value of each object of analysis corresponding to the item from the table to calculate the behavior score concerning each object of analysis based on an obtained weight value group and an attribute of the user, when generation of the item is detected from the user's network protocol use.

23. The method according to claim 19, wherein the evaluation step comprises the step of calculating the behavior score based on the number of uses of the network protocol in a predetermined unit period.

24. The method according to claim 19, further comprising the step of transmitting an alarm to a predetermined address based on the result of the analysis step.

25. A program which when executed by a computer system causes the system to execute:
   a monitor step of monitoring use of a network protocol by a user in a management object domain, where the user is authorized to use the network protocol;
   an evaluation step of calculating a behavior score of the user based on judging risk of the user leaking confidential information, tendency of the user to use network resources and likelihood of the user leaving an organization, from a monitored result of the network protocol use of the user;
   a record step of recording a reference time-series transition of the behavior score;
   an input step of inputting a contemporary time-series transition of the behavior score into an artificial neural network, wherein the neural network is trained using the reference time-series transition and wherein the contemporary time-series transition includes a time-series transition of the behavior score from a current time to a predetermined period prior to the current time;
   an analysis step of predicting a future value at a preset period after the current time based on an output of the neural network, wherein the output is determined based on the contemporary time-series transition, and judging a state of the user concerning the predetermined object of analysis based on the future value to output the judged state of the user.

26. A program which when executed by a computer system causes the system to execute:
   a monitor step of monitoring use of at least one network protocol by a user in a management object domain, where the user is authorized to use the network protocol;
   an evaluation step of calculating a behavior score of the user based on judging risk of the user leaking confidential information, tendency of the user to use network resources and likelihood of the user leaving an organization, from a monitored result of the network protocol use by the user;
   a record step of recording a reference time-series transition of the behavior score;
   an input step of inputting a contemporary time-series transition of the behavior score into an artificial neural network, wherein the neural network is trained using the reference time-series transition and wherein the contemporary time-series transition includes a time-series transition of the behavior score from a current time to a predetermined period prior to the current time;
   an analysis step of predicting a future value at a preset period after the current time based on an output of the neural network, wherein the output is determined based on the contemporary time-series transition, and judging a state of the user concerning the predetermined object of analysis based on the future value; and
   a control step of controlling whether or not the user is allowed to use at least one of the network protocols based on the judged state of the user.

* * * * *